United States Patent
Tuncer et al.

(10) Patent No.: US 8,623,941 B2
(45) Date of Patent: Jan. 7, 2014

(54) METHOD OF FORMING NANODIELECTRICS

(75) Inventors: Enis Tuncer, Knoxville, TN (US);
Georgios Polyzos, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 297 days.

(21) Appl. No.: 12/943,734

(22) Filed: Nov. 10, 2010

(65) Prior Publication Data

US 2012/0115989 A1    May 10, 2012

(51) Int. Cl.
*C08L 63/00* (2006.01)
*C08K 3/10* (2006.01)
*C08K 3/22* (2006.01)
*C08G 59/18* (2006.01)

(52) U.S. Cl.
USPC ........... 523/442; 523/457; 523/458; 977/779; 977/785; 977/787; 977/896; 977/900

(58) Field of Classification Search
USPC .......... 523/400, 442, 457, 458; 525/523, 524; 977/778, 779, 783, 785, 786, 787, 840, 977/895, 896, 900
See application file for complete search history.

(56) References Cited

U.S. PATENT DOCUMENTS

| | | | |
|---|---|---|---|
| 6,586,513 B1 | 7/2003 | Goto et al. | |
| 6,821,474 B2 | 11/2004 | Lauf et al. | |
| 2006/0074173 A1 | 4/2006 | Kogoi et al. | |
| 2007/0042174 A1 * | 2/2007 | Rao et al. | 428/323 |
| 2008/0022896 A1 | 1/2008 | Karkkainen | |
| 2008/0085962 A1 * | 4/2008 | Simone et al. | 524/403 |
| 2008/0188032 A1 | 8/2008 | Rantala | |
| 2009/0081522 A1 * | 3/2009 | Washima et al. | 429/34 |
| 2010/0135937 A1 | 6/2010 | O'Brien et al. | |

OTHER PUBLICATIONS

Polizos, G., et al., "Properties of a nanodielectric cryogenic resin," Applied Physics Letters, Apr. 12, 2010, vol. 96, 152903, pp. 1-3.

Tuncer, E., et al., "Electrical Properties of a Polymeric Nanocompsite with In-Situ Synthesized Nanoparticles", 2009 Annual Report Conference on Electrical Insulation and Dielectric Phenomona, 2009, pp. 527-530.

Tuncer, E., et al., "Nanodielectrics for Cryogenic Applications," IEEE Transactions on Applied Superconductivity, Jun. 2009, vol. 19 No. 3, pp. 2354-2358.

Tuncer, E., et al., "Enhancement of dielectric strength in nanocomposites," Nanotechnology, Jul. 13, 2007, vol. 18 No. 32, p. 325704.

* cited by examiner

*Primary Examiner* — Michael J Feely
(74) *Attorney, Agent, or Firm* — Pauley Petersen & Erickson

(57) ABSTRACT

A method of making a nanoparticle filled dielectric material. The method includes mixing nanoparticle precursors with a polymer material and reacting the nanoparticle precursors mixed with the polymer material to form nanoparticles dispersed within the polymer material to form a dielectric composite.

20 Claims, 4 Drawing Sheets

METHOD OF FORMING NANODIELECTRICS

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to dielectric materials having homogeneously distributed nanoparticles.

BACKGROUND OF THE INVENTION

In high voltage applications, dielectric breakdown strength of materials are employed to determine equipment size in design, and therefore power level. For example, to manufacture compact power transformers or cables for energy transmission with high power ratings, one needs to improve either the current carrying capacity of the conductors utilized or the electrical insulation properties of the utilized dielectric that withholds the system voltage. The product of the system current and voltage yields the system power rating.

The current electrical insulation technology uses many polymers (thermoplastics and thermosets). Polymer materials are extensively used in high voltage applications. Recently metal-oxide nanoparticle filled polymers have been shown to have improved electrical insulation properties. In these systems, uniform dispersion of particles is very important for obtaining materials with better electrical insulation and desired physical properties. Conventional mixing methods use ex-situ particles with relatively expensive high shear mixing techniques, such as twin-screw extruder. As such, a need continues for improved methods of homogeneously distributing nanoparticles in a polymer matrix to provide insulating materials.

SUMMARY OF THE INVENTION

The current invention provides a method of manufacturing insulating materials using a technique that does not require expensive high shear mixing methods. The invention includes a method for producing nanodielectrics using in-situ nanoparticle synthesis, and also includes the resulting nanodielectric material.

According to preferred embodiments of the invention, a method of making a dielectric includes a step of mixing nanoparticle precursors with a polymer material, and reacting the nanoparticle precursors mixed with the polymer material to form nanoparticles dispersed within the polymer material to form a dielectric composite. According to embodiments of this invention, the nanoparticles are introduced to the polymer as a particle precursor. The precursor reaction occurs after mixing with the polymer to produce particles mixed within the polymer material. The polymer creates "cages" where the precursor reaction takes place. The reaction results in monodispersed particles and homogeneous particle distribution in the matrix polymer. The method can be used to manufacture superior electrical insulation materials for high voltage technology. In addition the method of this invention can produce extremely small metal-oxide particles, which is important to improve dielectric/physical properties.

According to particular embodiments of this invention, the method of making a dielectric includes the steps of providing in a vessel a solution comprising nanoparticle precursors, adding to the vessel a nonpolar organic solvent that is not miscible with the aqueous solution, optionally adding to the vessel an organic solution comprising a polymer material and a polar organic diluent, such as that is miscible with the nonpolar organic solvent; mixing the aqueous solution and the organic solution to react the nanoparticle precursors to form nanoparticles, and, if needed, volatilizing the remaining solvent and diluent to form a dielectric composite comprising the polymer material as a matrix phase and the nanoparticles as a dispersed phase.

BRIEF DESCRIPTION OF THE DRAWINGS

The above-mentioned and other features and objects of this invention will be better understood from the following detailed description taken in conjunction with the drawings wherein.

DETAILED DESCRIPTION OF THE INVENTION

Figure 1:
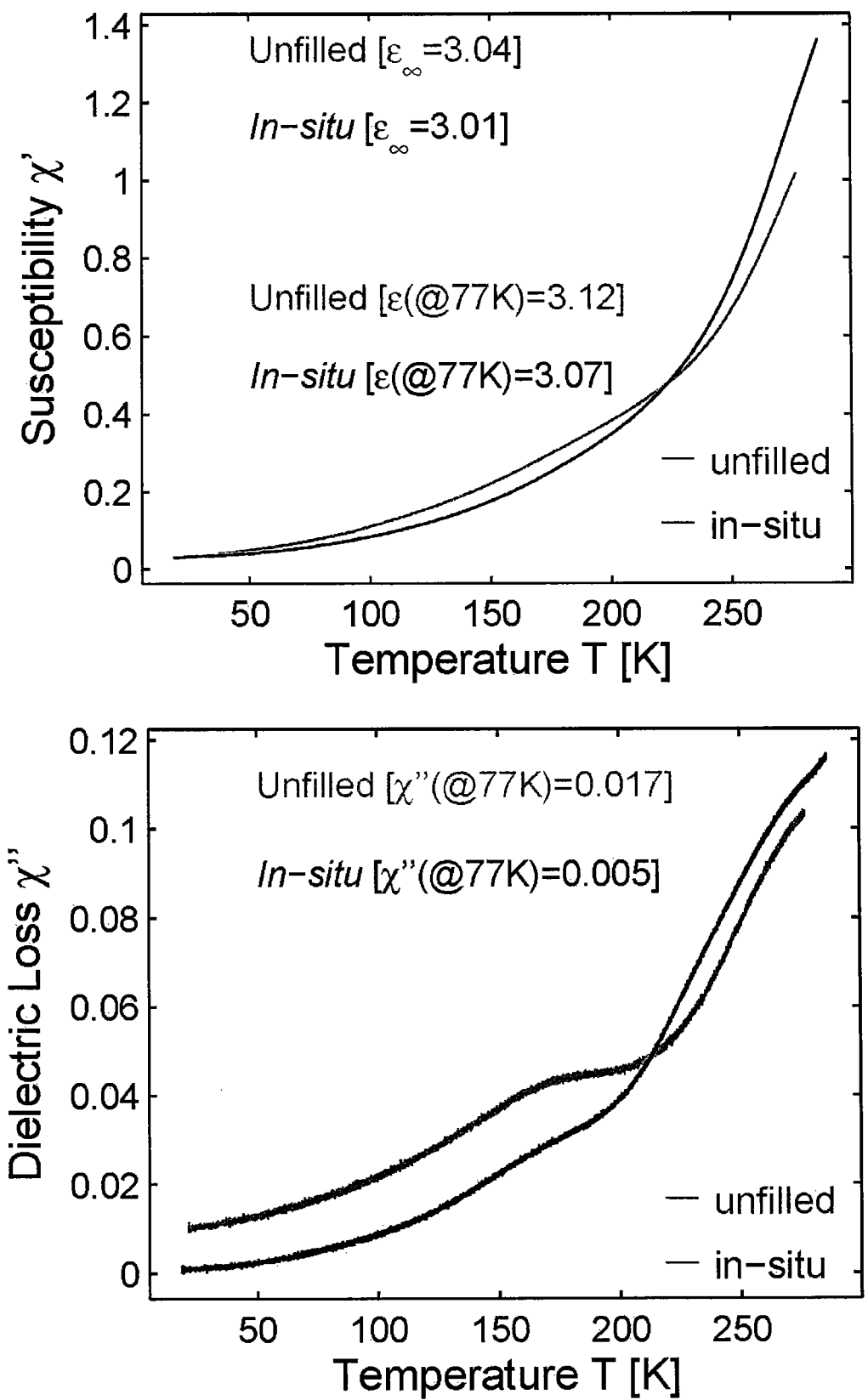
FIG. 1 shows dielectric properties as a function of temperature of a nanodielectric prepared according to this invention compared to an unfilled polymer.

This invention provides an insulating material fabrication method, and an insulating material with high dielectric strength that can be employed in high voltage technology used in conventional and cryogenic high temperature superconductive power applications.

The present invention includes a method of making a dielectric material. In one embodiment of this invention, an amount of a nanoparticle precursor is added to, such as by mixing, an amount of a polymer material. The nanoparticle precursor reacts to form nanoparticles during and/or after the mixing, such as due to the result of the mixing itself, and/or by addition of a reaction initiating component. The resulting nanoparticles are dispersed, and desirably homogeneously distributed, within the polymer material. The polymer matrix provides "cage" spaces where the precursor reaction takes place. The reaction results in monodispersed particles and a homogeneous particle distribution in the matrix polymer.

The nanoparticle precursors can include any one or more materials suitable and/or necessary to form the desired nanoparticles. Exemplary nanoparticle precursors include metal halides, which react to form metal nanoparticles. Exemplary nanoparticles include metal or other oxides, such as titanium dioxide, zinc oxide, or silicone dioxide. In one particularly preferred embodiment, the nanoparticle precursor is titanium trichloride ($TiO_3$), which reacts upon mixing to form titanium dioxide ($TiO_2$) nanoparticles. In one embodiment of this invention, the formed nanoparticles desirably have an average particle size of about 2 to about 20 nanometers, and such a small particle size can be important for improving dielectric/physical properties.

The nanoparticle precursors, such as metal halides, are contained in solution for mixing with the polymer. Adding an acid, such as hydrochloric (HCL) acid, or other suitable material to the solution can be used as needed to keep the nanoparticle precursors in solution. In one embodiment of this invention, the precursor solution is mixed in a vessel with an organic solution including the polymer material or a resin component of the finally desired polymer dielectric. A diluent, such as methanol, that it is compatible (miscible) both with the polymer and the precursor is desirably selected for the organic solution. The precursor solution can contain either the same diluent or a solution compatible with the diluent. Other solvents may be required to aid in the mixing and combination of the aqueous precursor solution and the resin material. For example, a nonpolar organic solvent, such as xylene, that is not miscible with an aqueous precursor solution is added to the vessel to cover the organic polymer solution.

Any suitable mixing method can be used to mix the nanoparticle precursors with the polymer material. Desirably, the mixing alone causes the nanoparticle precursors to react to form nanoparticles. The mixing of the polymer solution and the precursor desirably continues until the particle reaction occurs. Depending on the system, the reaction can be accelerated with temperature. The mixing step desirably results in a homogeneous distribution of the nanoparticles within the polymer material. A volatizing step can optionally be used, as needed, such as to remove any remaining solvent and diluent. The mixing and/or volatizing provide a dielectric composite including the polymer material as a matrix phase and the nanoparticles as a dispersed phase.

Various and alternative polymers and polymer combinations can be used to form the dielectric composite of this invention. Suitable polymer materials include thermoplastic and thermoset polymers currently used in forming dielectrics. One particularly preferred polymer material for use in this invention is epoxy, such as a two component epoxy resin commercially known as ARALDITE (Huntsman International LLC). When using a two component material, the polymer material mixed with the nanoparticle precursor can optionally include only one of the two components. The second component can be added and mixed with the first component before or after the precursor has been added and/or mixed, depending on need. In one embodiment of this invention a second resin component is mixed with a first resin component after the reacting of the nanoparticle precursors to form the nanoparticles.

The present invention is described in further detail in connection with the following examples which illustrate or simulate various aspects involved in the practice of the invention. It is to be understood that the examples are included to assist in the understanding of this invention and are in no way limiting to the invention in its broad application. All changes that come within the spirit of the invention are desired to be protected and thus the invention is not to be construed as limited by these examples.

EXAMPLES

A dielectric composite was made according to a method of this invention. The selected polymer was a two component epoxy resin, commercially known as ARALDITE 5808. One of the components of the epoxy was diluted with methanol. A precursor solution of a titanium trichloride and methanol was added to the diluted epoxy. The combination was mixed with a magnetic stirrer under vacuum. The second component of the epoxy was added to the first mixture after mixing and a composite was formed. A similar procedure would also be suitable for other resins and single component thermoplasts and polymers. An unfilled ARALDITE 5808 epoxy was used for control testing.

FIGS. 1-4 summarize the measured properties of the prepared nanodielectric compared to the unfilled epoxy material. The dielectric properties of susceptibility level and the relative permittivity at optical frequencies of the unfilled and in-situ filled nanodielectric were similar (approximately 3). As seen in FIG. 1, the dielectric relaxation characteristics were different (FIG. 1). The losses as a function of temperature illustrate that the in-situ method according to this invention created a material with lower losses than the unfilled resin at temperatures below 200 K. At 20 K the losses in the prepared nanodielectric were 10 times lower than the unfilled material.

Figure 2:
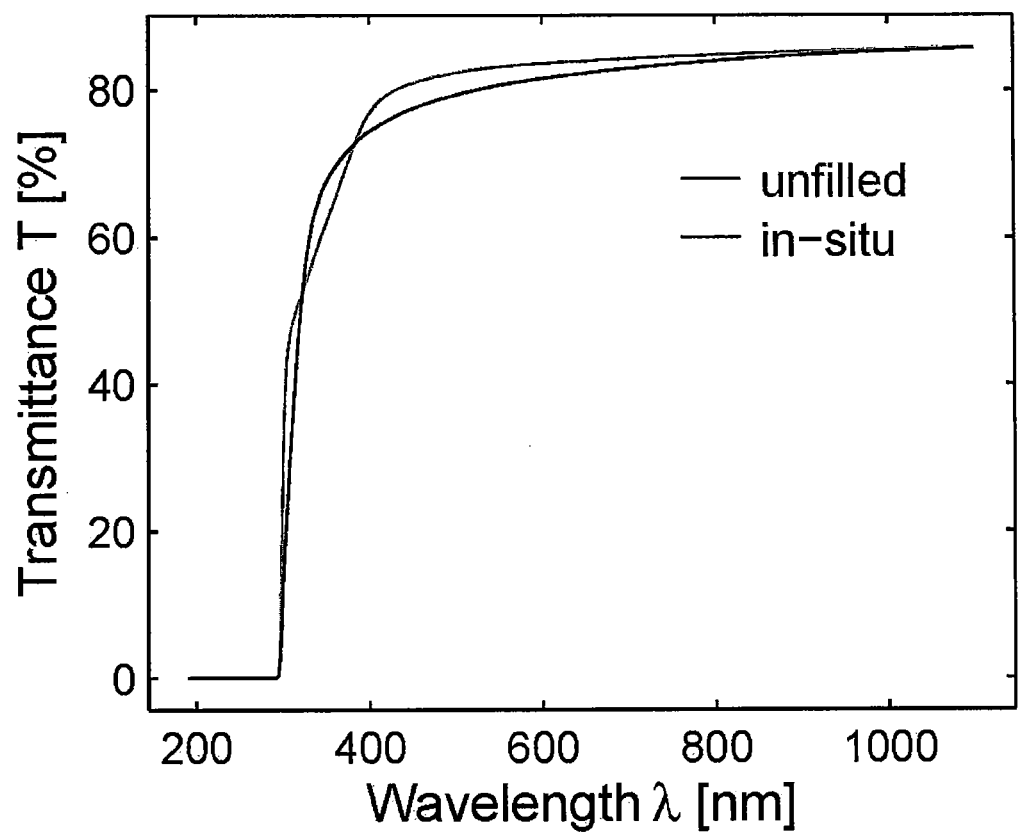
FIG. 2 shows optical properties (for UV and visible wavelengths) of a nanodielectric prepared according to this invention compared to an unfilled polymer.
Figure 3:
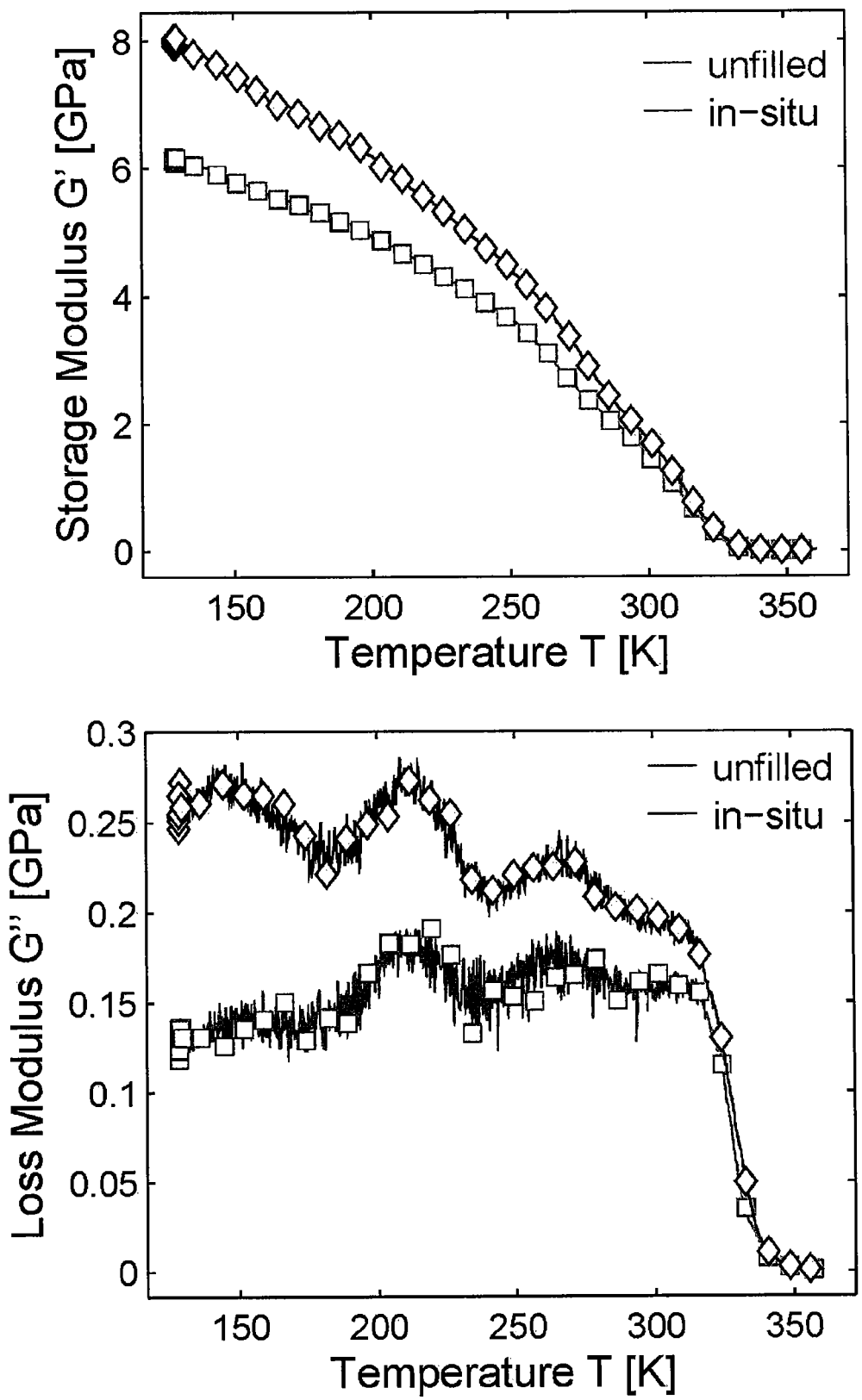
FIG. 3 shows mechanical properties as a function of temperature of a nanodielectric prepared according to this invention compared to an unfilled polymer.

FIG. 2 shows that the optical properties of the nanodielectric were similar to the unfilled resin at ultraviolet and visible regions. Mechanical properties of the prepared nanodielectric compared to the unfilled materials are shown in FIG. 3. The in-situ nanodielectric had a higher storage modulus than the unfilled resin. The storage modulus was 30% higher at 145 K. The nanodielectric was thus mechanically stronger than the unfilled resin.

Figure 4:
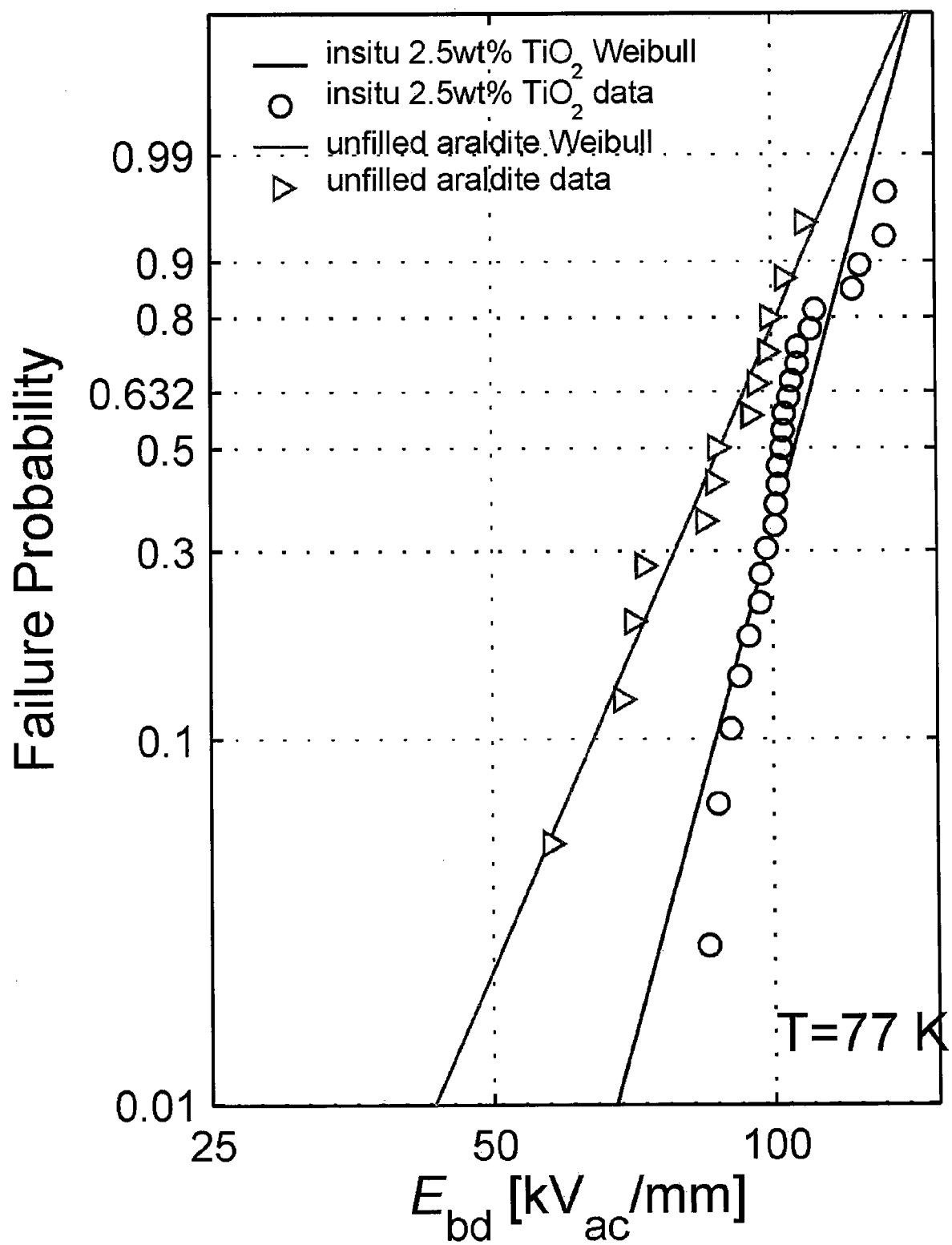
FIG. 4 shows breakdown properties of a nanodielectric prepared according to this invention compared to an unfilled polymer.

As shown in the Weibull plot of FIG. 4, the breakdown data of the nanodielectric was significantly improved compared to the unfilled resin. It was observed that the nanodielectric had approximately 60% higher design breakdown strength than the unfilled resin (failure probability at 0.01 level). This shows that the nanodielectric resin can be used in applications where size/volume of the high voltage instrument is important. An insulation design with the prepared nanodielectric resin can thus be 60% thinner than the unfilled resin. For example for a 20 kV insulation, the unfilled resin would be approximately 0.5 mm, however, the nanodielectric resin would be 0.3 mm.

Thus the invention provides an improved method for forming a nanoparticle filled dielectric material. The in-situ formation of nanoparticles during the mixing step improves mixing as compared to mixing preformed nanoparticles with polymer materials. The nanodielectrics provided by this invention provide improved physical properties, such as over comparable unfilled materials, thereby providing suitable materials for various high voltage applications.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of making a dielectric composite, comprising:
   introducing nanoparticle precursors to a polymer material comprising a first component of a two component epoxy resin system;
   mixing the nanoparticle precursors with the polymer material; and
   reacting the mixed nanoparticle precursors to form nanoparticles dispersed within the polymer material;
   wherein a second component of the two-component epoxy resin system is mixed with the polymer material after the nanoparticle precursors are introduced to the polymer material and before or after formation of the nanoparticles.

2. The method of claim 1 wherein the second component of the two-component epoxy resin system is mixed with the polymer material after the nanoparticle precursors are introduced to the polymer material and after formation of the nanoparticles.

3. The method of claim 1 wherein the nanoparticle precursors are introduced as an aqueous solution of nanoparticle precursors.

4. The method of claim 1 wherein the nanoparticle precursors comprise metal halides.

5. The method of claim 1 wherein the formed nanoparticles have an average particle size of about 2 to about 20 nanometers.

6. A method of making a dielectric composite, comprising:
adding a nonpolar solvent to an aqueous solution of nanoparticle precursors;
introducing the aqueous solution of nanoparticle precursors to a polymer material;
mixing the aqueous solution of nanoparticle precursors with the polymer material; and
reacting the mixed nanoparticle precursors to form nanoparticles dispersed within the polymer material.

7. The method of claim 6 wherein the nanoparticle precursors comprise metal halides.

8. The method of claim 6 further comprising volatizing any remaining nonpolar solvent and water.

9. The method of claim 6 wherein the formed nanoparticles have an average particle size of about 2 to about 20 nanometers.

10. The method of claim 6 wherein the formed nanoparticles are homogeneously distributed within the polymer material.

11. The method of claim 6 wherein the aqueous solution of nanoparticle precursors is introduced to an organic solution of the polymer material, and the aqueous solution of nanoparticle precursors is mixed with the organic solution of polymer material.

12. A method of making a dielectric composite, comprising:
introducing an aqueous solution of nanoparticle precursors to a vessel;
adding a nonpolar organic solvent that is not miscible with the aqueous solution to the vessel;
adding an organic solution of a polymer material and a polar organic diluent to the vessel; and
mixing the aqueous solution, the organic solution, and the nonpolar organic solvent, causing the nanoparticle precursors to react and to form nanoparticles dispersed within the polymer material; and
volatilizing any remaining water, nonpolar organic solvent and polar organic diluent.

13. The method of claim 12 wherein the nanoparticle precursors comprise titanium halides and the nanoparticles comprise titanium dioxide.

14. The method of claim 12 further comprising adding an acid to the aqueous solution to keep the nanoparticle precursors in solution.

15. The method of claim 12 wherein the formed nanoparticles are homogeneously distributed within the polymer material.

16. The method of claim 12 wherein the formed nanoparticles have an average particle size of about 2 to about 20 nanometers.

17. A method of making a dielectric composite, comprising:
introducing a solution of nanoparticle precursors to a vessel;
adding an organic solution of a polymer material and a polar organic diluent to the vessel; and
mixing the solution of nanoparticle precursors and the organic solution, causing the nanoparticle precursors to react and to form nanoparticles dispersed within the polymer material;
wherein the polymer material comprises an epoxy resin.

18. The method of claim 17 wherein the epoxy resin is a first component of a two component epoxy resin system, and further comprising mixing a second component of the two component epoxy resin system with the polymer material after the organic solution is added to the vessel and before or after formation of the nanoparticles.

19. A method of making a dielectric composite, comprising:
introducing an aqueous solution of titanium trichloride to a vessel, wherein the aqueous solution comprises a sufficient concentration of acid to keep the titanium trichloride in solution;
adding a nonpolar organic solvent that is not miscible with the aqueous solution to the vessel, to cover the aqueous solution;
adding an organic solution of a resin and a polar organic diluent to the vessel;
mixing the aqueous solution, the organic solution, and the nonpolar organic solvent, causing the titanium trichloride to hydrolyze and to form titanium dioxide nanoparticles dispersed within the resin, wherein the formed nanoparticles have an average particle size of about 2 nm to about 20 nm; and
volatilizing any remaining water, nonpolar organic solvent and polar organic diluent.

20. The method of claim 19, wherein the acid comprises hydrochloric acid, the nonpolar organic solvent comprises xylene, and the polar organic diluent comprises methanol.

* * * * *